United States Patent [19]

Kataoka

[11] Patent Number: 5,459,370
[45] Date of Patent: Oct. 17, 1995

US005459370A

[54] VIBRATION TYPE MOTOR DEVICE

[75] Inventor: Kenichi Kataoka, Yokohama, Japan

[73] Assignee: Canon Kabushiki Kaisha, Tokyo, Japan

[21] Appl. No.: 376,525

[22] Filed: Jan. 23, 1995

Related U.S. Application Data

[63] Continuation of Ser. No. 51,673, Apr. 23, 1993, abandoned.

[30] Foreign Application Priority Data

Apr. 24, 1992 [JP] Japan ................................. 4-106668

[51] Int. Cl.$^6$ .............................. H02N 2/14; H01L 41/09
[52] U.S. Cl. ................................................................ 310/317
[58] Field of Search ................................ 310/316, 317; 318/116

[56] References Cited

U.S. PATENT DOCUMENTS 4,488,145  12/1984  Katsuma et al. ........................ 310/317
4,952,834  8/1990  Okada ...................................... 310/316
5,004,964  4/1991  Kataoka et al. ......................... 318/128
5,013,982  5/1991  Sasaki ..................................... 310/316

FOREIGN PATENT DOCUMENTS 1-008873  1/1989  Japan ............................... H02N 2/00

*Primary Examiner*—Thomas M. Dougherty
*Attorney, Agent, or Firm*—Fitzpatrick, Cella, Harper & Scinto

[57] ABSTRACT

A vibration type motor device for applies a driving signal to a piezoelectric element to obtain a driving force.

When the driving signal is applied to the piezoelectric element via a transformer, pulses having different pulse widths can be applied to first and second switching elements, which switch the direction of a current to be supplied to the primary coil of the transformer, and the resolution of the digital driving control is improved.

11 Claims, 5 Drawing Sheets

FIG. 2

| PULSE WIDTH | $G_2$ | $G_1$ | $G_0$ |
|---|---|---|---|
| 1 | 0 | 0 | 0 |
| 2 | 0 | 0 | 1 |
| 3 | 0 | 1 | 1 |
| 4 | 0 | 1 | 0 |
| 5 | 1 | 1 | 0 |
| 6 | 1 | 1 | 1 |
| 7 | 1 | 0 | 1 |
| 8 | 1 | 0 | 0 |

FIG. 3

| PULSE WIDTH \ Q | 0 | 1 | 2 | 3 | 4 | 5 | 6 | 7 |
|---|---|---|---|---|---|---|---|---|
| 1 | B | | | | | | | |
| 2 | B | | | | A | | | |
| 3 | B | B | | | A | | | |
| 4 | B | B | | | A | A | | |
| 5 | B | B | B | | A | A | A | |
| 6 | B | B | B | | A | A | A | |
| 7 | B | B | B | B | A | A | A | |
| 8 | B | B | B | B | A | A | A | A |

FIG. 5

| PULSE WIDTH | G4 | G3 | G2 | G1 | G0 |
|---|---|---|---|---|---|
| 1 | 0 | 0 | 0 | 0 | 0 |
| 2 | 0 | 0 | 0 | 0 | 1 |
| 3 | 0 | 0 | 0 | 1 | 1 |
| 4 | 0 | 0 | 0 | 1 | 0 |
| 5 | 0 | 0 | 1 | 1 | 0 |
| 6 | 0 | 0 | 1 | 1 | 1 |
| 7 | 0 | 0 | 1 | 0 | 1 |
| 8 | 0 | 0 | 1 | 0 | 0 |
| 9 | 0 | 1 | 1 | 0 | 0 |
| 10 | 0 | 1 | 1 | 0 | 1 |
| 11 | 0 | 1 | 1 | 1 | 1 |
| 12 | 0 | 1 | 1 | 1 | 0 |
| 13 | 0 | 1 | 0 | 1 | 0 |
| 14 | 0 | 1 | 0 | 1 | 1 |
| 15 | 0 | 1 | 0 | 0 | 1 |
| 16 | 0 | 1 | 0 | 0 | 0 |
| -16 | 1 | 1 | 0 | 0 | 0 |
| -15 | 1 | 1 | 0 | 0 | 1 |
| -14 | 1 | 1 | 0 | 1 | 1 |
| -13 | 1 | 1 | 0 | 1 | 0 |
| -12 | 1 | 1 | 1 | 1 | 0 |
| -11 | 1 | 1 | 1 | 1 | 1 |
| -10 | 1 | 1 | 1 | 0 | 1 |
| -9 | 1 | 1 | 1 | 0 | 0 |
| -8 | 1 | 0 | 1 | 0 | 0 |
| -7 | 1 | 0 | 1 | 0 | 1 |
| -6 | 1 | 0 | 1 | 1 | 1 |
| -5 | 1 | 0 | 1 | 1 | 0 |
| -4 | 1 | 0 | 0 | 1 | 0 |
| -3 | 1 | 0 | 0 | 1 | 1 |
| -2 | 1 | 0 | 0 | 0 | 1 |
| -1 | 1 | 0 | 0 | 0 | 0 |

FIG. 7

| PULSE WIDTH | G2 | G1 | G0 |
|---|---|---|---|
| 1 | 0 | 0 | 0 |
| 2 | 0 | 0 | 1 |
| 3 | 0 | 1 | 1 |
| 4 | 0 | 1 | 0 |
| 5 | 1 | 1 | 0 |
| 6 | 1 | 0 | 0 |

FIG. 6

| PULSE WIDTH \ Q | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 1 | A | | | | C | | | | | | | | | | | |
| 2 | A | | | | C | | | | B | | | | | | | |
| 3 | A | | | | C | | | | B | | | | | | | |
| 4 | A | A | | | C | | | | B | | | | | | | |
| 5 | A | A | | | C | C | | | B | | | | D | | | |
| 6 | A | A | | | C | C | | | B | B | | | D | | | |
| 7 | A | A | | | C | C | C | | B | B | | | D | | | |
| 8 | A | A | A | | C | C | C | | B | B | B | | D | D | | |
| 9 | A | A | A | | C | C | C | | B | B | B | | D | D | | |
| 10 | A | A | A | | C | C | C | | B | B | B | | D | D | D | |
| 11 | A | A | A | A | C | C | C | C | B | B | B | B | D | D | D | |
| 12 | A | A | A | A | C | C | C | C | B | B | B | B | D | D | D | |
| 13 | A | A | A | A | C | C | C | C | B | B | B | B | D | D | D | |
| 14 | A | A | A | A | C | C | C | C | B | B | B | B | D | D | D | |
| 15 | A | A | A | A | C | C | C | C | B | B | B | B | D | D | D | D |

VIBRATION TYPE MOTOR DEVICE

This application is a continuation of application Ser. No. 08/051,673 filed Apr. 23, 1993, now abandoned.

BACKGROUND OF THE INVENTION

1. Field of the Invention

The present invention relates to a control circuit for a vibration type driving device (vibration wave motor).

2. Related Background Art

In a known vibration type driving device (vibration wave motor control circuit), a circuit for changing the width of a pulse to be input to a switching element for applying a driving voltage to a motor is constituted by an analog circuit, as disclosed in Japanese Laid-Open Patent Application No. 64-8873.

In the above-mentioned prior art, the circuit for changing the pulse width suffers from the following drawbacks associated with the use of an analog circuit:

(i) A signal is easily disturbed by noise.

(ii) Since D/A conversion is necessary when the circuit is controlled by a computer, a large number of D/A converters are required, resulting in high cost.

(iii) The control circuit is not suitable for an IC structure; and when a digital arrangement is to be adopted, if the resolution is increased, then the number of logic elements is increased, thus considerably increasing manufacturing costs.

SUMMARY OF THE INVENTION

In one aspect, the present invention provides a control circuit capable of arbitrarily setting a driving pulse width for driving a vibration type driving device.

In another aspect, the present invention provides a control circuit for driving a vibration type driving device by forming a driving voltage for an electro-mechanical energy conversion element according to ON/OFF states of first and second switching elements, wherein the driving pulse widths for turning on the first and second switching elements can be independently set for the first and second switching elements.

In yet another aspect, the present invention provides a control circuit, which can independently set pulse signal widths for forming frequency signals having different phases upon application of the frequency signals to an electro-mechanical energy conversion element.

Other objects aspects of the present invention will become apparent from the following description of the illustrated embodiments taken in conjunction with the accompanying drawings.

BRIEF DESCRIPTION OF THE DRAWINGS

FIG. 2 is a table showing the relationship between the pulse width and the pulse width setting command code in the arrangement shown in FIG. 1;

FIG. 3 is a table showing the relationship among the output from a counter 19, the pulse width, and signals A and B in the arrangement shown in FIG. 1;

FIG. 5 is a table showing the relationship between the pulse width and the command code in the arrangement shown in FIG. 4;

FIG. 6 is a table showing the relationship among the pulse width, the command code, and signals A and B in the arrangement shown in FIG. 4; and FIG. 7 is a table showing the relationship between the command code and the pulse width.

DESCRIPTION OF THE EMBODIMENTS OF THE INVENTION

Figure 1:
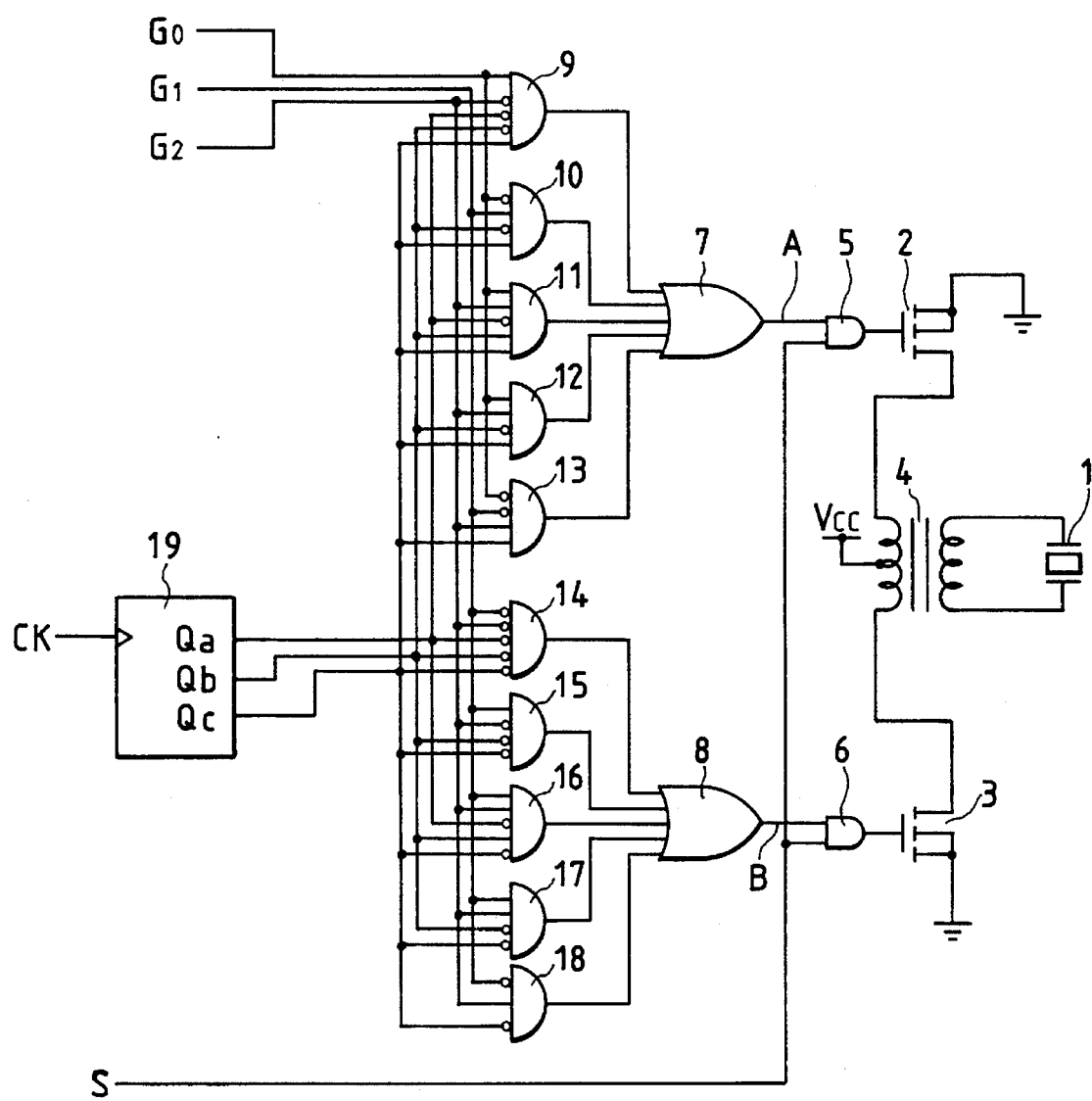
FIG. 1 is a circuit diagram showing a vibration wave motor control circuit according to a first embodiment of the present invention.

FIG. 1 is a circuit diagram showing a vibration wave motor control circuit according to a first embodiment of the present invention. The circuit shown in FIG. 1 includes a piezoelectric element 1, FETs 2 and 3, a transformer 4, AND gates 5, 6, and 9 to 18, OR gates 7 and 8, and a counter 19.

The operation of this embodiment will be described below with reference to FIGS. 2 and 3.

Command codes $G_2$, $G_1$, and $G_0$ ($G_0$=L.S.B) are used for setting the pulse widths of signals A and B, and form a 3-bit gray code indicating one of pulse widths "1" to "8", as shown in FIG. 2. The pulse waveforms of the signals A and B will be described below with reference to FIG. 3. Q represents outputs $Q_c$, $Q_b$, and $Q_a$ ($Q_a$=L.S.B) from the counter 19 in hexadecimal notation. In FIG. 3, A and B represent high-level states of the signals A and B. For example, in the case of the pulse width "5" ($G_2$, $G_1$, $G_0$=1, 1, 0), the signal B goes to high level when Q="0" to "2", and the signal A goes to high level when Q="4" and "5". A signal S is a signal for connecting/disconnecting the signals A and B to/from the FETs 2 and 3, and a signal CK is a clock signal having a frequency eight times that of a driving signal.

More specifically, in the case of the pulse width "5" ($G_2$, $G_1$, $G_0$=1, 1, 0), of the AND gates 14 to 18, only the AND gates 16 and 17 are enabled. The AND gate 17 outputs a high (H)-level signal when the count value Q of the counter 19 is "0" and "1", and the AND gate 16 outputs an H-level signal when the count value Q is "2". Therefore, as shown in the row of the pulse width "5" in FIG. 3, an output B from the OR gate 8 goes to H level while the count value of the counter falls within a range from "0" to "2".

On the other hand, in the case of the pulse width "5", of the AND gates 9 to 13, only the AND gate 10 is enabled. The AND gate 10 outputs an H-level signal when the count value Q of the counter 19 is "4" and "5". Therefore, as shown in the row of the pulse width "5" in FIG. 3, an output A from the OR gate 7 goes to H level while the count value is "4" and "5".

If the signal S indicates H level, since the output A is supplied to the FET 2 as a switching element via the AND gate 5, the FET 2 is turned on while the count value is "4" and "5" when the counter 19 repeats count operations from "0" to "7". On the other hand, the output B is supplied to the FET 3 while the counter 19 indicates "0" to "2". During this interval, the FET 3 is turned on. Therefore, when the count value="0" to "2", "4", and "5", a reverse current flows through the transformer 4, and a secondary output generated in the transformer 4 is applied to the piezoelectric element 1.

In the above description, the case of the pulse width "5" has been illustrated by example. When the command codes $G_2$, $G_1$, and $G_0$ are set to have different values, as shown in FIG. 2, the outputs B and A change in correspondence with the count value (FIG. 3) of the counter 19 in accordance with the set pulse width, thereby adjusting the secondary output state to be applied to the piezoelectric element 1.

According to the arrangement of this embodiment, a pulse width with a double resolution can be obtained without increasing the number of bits of the counter, and since the pulse width is commanded using gray codes, the number of inputs to the OR gate 7 can be decreased.

In FIG. 2, the pulse width is set in eight steps. Alternatively, codes may be used up to a middle code or may be used from the middle code, or codes which change bit by bit may be used, as shown in FIG. 7. A method of determining the pulse width of each pulse in the case of the pulse width "5" described above will be explained below. If the pulse width commands "1" to "8" are respectively represented by $P_0$ to $P_7$, the pulse width "5" is represented by $P_k$ (k=4).

Since there are two phases of output pulses A and B, if the number of phases is represented by r, then r=2.

When the pulse width of each phase is represented by $S_m$ (m=0, 1, ..., (l–1)), the pulse widths of A and B phases are respectively represented by $S_0$ and $S_1$, a pulse width $W_{ma}$ which can be actually designated is expressed in five steps, i.e., $W_{00}$ to $W_{04}$ and $W_{10}$ to $W_{14}$ including a pulse width= "0", and an arbitrary offset value b is set to be 1, $S_m$ is given by:

$$S_m = (k+m+b)/r$$

The conditions for $S_0$ are m=0, k=4, b=1, and r=2, and the conditions for $S_1$ are m=1, k=4, b=1, and r=2.

Therefore, $S_0$ and $S_1$ are respectively given by:

$$S_0 = \frac{4+0+1}{2} = 2.5$$

$$S_1 = \frac{4+1+1}{2} = 3$$

When fractions below the decimal point are rounded off, the pulse width of the A phase is $S_0=W_{02}=2$, and the pulse width of the B phase is $S_1=W_{13}=3$.

Figure 4:
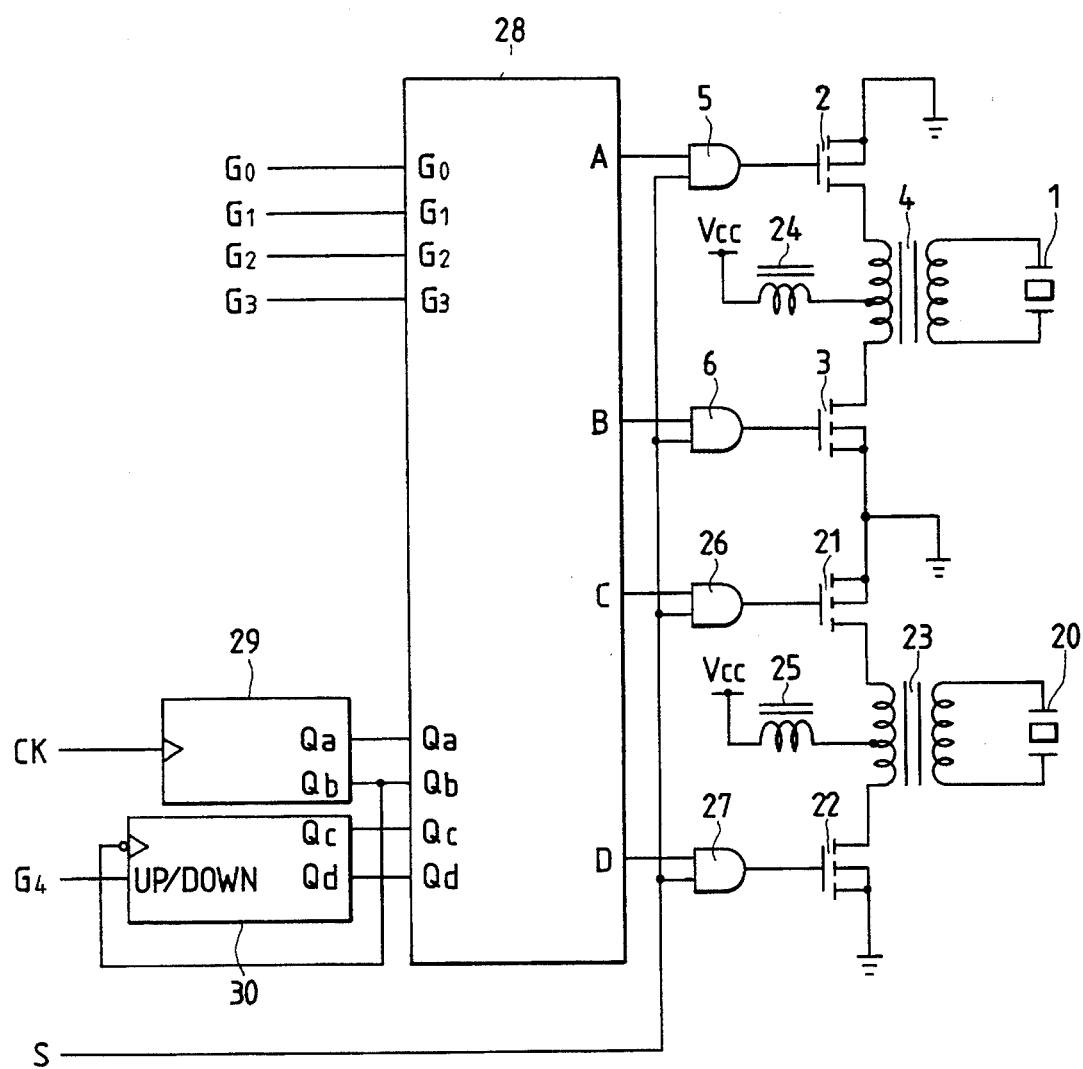
FIG. 4 is a circuit diagram showing an arrangement of a vibration wave motor control circuit according to a second embodiment of the present invention.

FIG. 4 is a circuit diagram showing a second embodiment of the present invention. The circuit shown in FIG. 4 further includes a piezoelectric element 20, FETs 21 and 22, a transformer 23, choke coils 24 and 25 for smoothing a driving waveform, AND gates 26 and 27, a pulse width setting circuit 28, a counter 29, and a conventional up/down counter 30. This embodiment illustrates a case wherein driving voltages of two phases have a 90° phase difference therebetween. The operation of this embodiment will be described below with reference to FIGS. 5 and 6.

FIG. 5 shows gray codes corresponding to pulse width commands. A sign attached to each relevant pulse width value represents the advance or delay between the two phases of the driving voltages, and a code $\overline{G_4}$ indicates this sign. The code $\overline{G_4}$ is connected to an UP/$\overline{\text{DOWN}}$ terminal of the up/down counter 30. When $G_4=1$, the pulse width setting circuit 28 outputs pulses in the order of A→C→B→D based on the count values of the counters 29 and 30 when the counter 29 counts clocks CK. On the other hand, when $G_4=0$, the circuit 28 outputs pulses in the order of A→D→B→C.

FIG. 6 shows signals A, B, C, and D output from the setting circuit 28 in response to the pulse width commands shown in FIG. 5, and Q represents outputs $Q_d$, $Q_c$, $Q_b$, and $Q_a$ ($Q_a$=L.S.B) from the counter 29 and the up/down counter 30 in hexadecimal notation. In FIG. 6, A, B, C, and D indicate high-level states of the signals A, B, C, and D in correspondence with the counter value Q. In this manner, since 16 steps of pulse widths can be set based on four steps of pulse widths per phase, i.e., for each of A, B, C, and D phases, a high-resolution pulse width can be set by a small-scale circuit. The pulse widths of A, B, C, and D phases will be calculated as in the first embodiment. Assume that pulse width commands "1" to "15" are represented by $P_0$ to $P_{14}$, and the command $P_9$ will be illustrated. When the number of phases r=4, the pulse widths of the A, B, C, and D phases are respectively represented by $S_3$, $S_1$, $S_2$, and $S_0$, an arbitrary offset value b is set to 2, and pulse widths which can be respectively designated for the pulse widths $S_0$, $S_1$, $S_2$, and $S_3$ are expressed in five steps, i.e., $W_{00}$ to $W_{04}$, $W_{10}$ to $W_{14}$, $W_{20}$ to $W_{24}$, and $W_{30}$ to $W_{34}$, $S_0$, $S_1$, $S_2$, and $S_3$ are respectively given by:

$$S_0 = \frac{9+0+2}{4} = 2.75$$

$$S_1 = \frac{9+1+2}{4} = 3$$

$$S_2 = \frac{9+2+2}{4} = 3.25$$

$$S_3 = \frac{9+3+2}{4} = 3.5$$

If fractions below the decimal point are rounded off, the pulse width of the A phase is $W_{33}$; the B phase, $W_{13}$; the C phase, $W_{23}$; and the D phase, $W_{02}$.

With the above-mentioned arrangement, the signals A and B are output according to the pulse widths set at a timing of the count value Q shown in FIG. 6, and AND gates 5 and 6 output H-level signals to drive a transformer 4 with the pulse widths of the signals A and B, thus applying a driving voltage to a first-phase piezoelectric element 1. Similarly, the outputs from the AND gates 26 and 27 go to H level with the pulse widths of the outputs C and D (respectively having a 90° phase difference from the outputs A and B) to drive the transformer 23 with the pulse widths of the outputs C and D, thereby applying a driving voltage to the second-phase piezoelectric element 20. In this case, as described above, since the pulses widths of the pulses (A, B) for the first phase and the pulses (C, D) for the second phase can be independently set, arbitrary driving voltages can be applied to the first and second phases.

In the above embodiment, as described in, e.g., U.S. Pat. No. 4,833,358, the piezoelectric element is arranged on a vibrating member, and forms a travelling vibration wave to obtain a driving force for driving an object. In place of the piezoelectric element, other electro-mechanical conversion elements such as an electrostrictive element may be used.

What is claimed is:

1. A vibration type driving device for applying a driving signal to an electro-mechanical energy conversion element to obtain a driving force, comprising:

first and second switching elements for forming a driving signal to be applied to an energy conversion element when said first and second switching elements are turned on/off; and a pulse signal forming circuit for independently forming a first pulse for driving said first switching element and a second pulse for driving said second switching element, said pulse signal forming circuit including a setting circuit for independently setting a pulse width of the first pulse and a pulse width of the second pulse based on a pulse having a predetermined pulse width, each pulse width being set using the predetermined pulse width as a unit width.

2. A device according to claim 1, wherein said pulse signal forming circuit alternately forms the first and second pulses.

3. A device according to claim 1, further comprising a transformer, and wherein when said first switching element is ON, a current flows from a power supply to a primary coil in a first direction, and when said second switching element is ON, a current flows from said power supply to said primary coil in a second direction different from the first direction, thereby applying an output from said transformer to said electro-mechanical energy conversion element.

4. A device according to claim 2, further comprising a transformer, and wherein when said first switching element is ON, a current flows from a power supply to a primary coil in a first direction, and when said second switching element is ON, a current flows from said power supply to said primary coil in a second direction different from the first direction, thereby applying an output from said transformer to said electro-mechanical energy conversion element.

5. A vibration type driving device for applying a plurality of frequency signals having different phases to an electro-mechanical energy conversion element to obtain a driving force, comprising:

a pulse signal forming circuit for outputting pulse signals having a predetermined pulse width, said pulse signal forming circuit having respective circuit portions corresponding to each of the frequency signals, each of the frequency signals having a power corresponding to a pulse signal having a pulse width output by a corresponding circuit portion of said pulse signal forming circuit;

a pulse width setting circuit having a setting circuit portion for each circuit portion of said pulse signal forming circuit, each circuit portion of said pulse signal forming circuit independently forming pulse signals having a pulse width corresponding to a pulse width set by a respective setting circuit portion of said pulse width setting circuit.

6. A vibration type driving device for applying a driving signal to an electro-mechanical energy conversion element to obtain a driving force, comprising:

a driving signal applying circuit for applying a driving signal having a first polarity to an electromechanical energy conversion element, and for applying a second driving signal having a second polarity opposite to the first polarity to the electro-mechanical energy conversion element;

a first time period setting circuit for determining a first time period in which a driving signal is applied with the first polarity to the electro-mechanical energy conversion element, said first time period setting circuit having varying means for varying the first time period; and a second time period setting circuit for determining a second time period in which a driving signal is applied with the second polarity to the electro-mechanical energy conversion element, said second time period setting circuit having varying means for varying the second time period, said second time period setting circuit setting the second time period independently of said first time period setting circuit.

7. A device according to claim 6, wherein
said first time period setting circuit varies an output width using a predetermined pulse width as a unit width, and determines the first time period in response to a set pulse width, and said second time period setting circuit varies an output pulse width using the standard pulse width as a unit width and determines the second time period in response to a set pulse width.

8. A vibration type driving device for applying a first frequency signal to a first electro-mechanical energy conversion element, and for applying a second frequency signal different in phase from the first frequency to a second electro-mechanical energy conversion element to obtain a driving force, comprising:

a first time period setting circuit for determining an applying period of a frequency signal applied to the first electro-mechanical energy conversion element, said first time period setting circuit having varying means for varying the applying period; and a second time period setting circuit for determining an applying period of a frequency signal applied to the second electro-mechanical energy conversion element, said second time period setting circuit having varying means for varying the applying period, said second time period setting circuit setting the applying period independently of said first time period setting circuit.

9. A device according to claim 8, wherein said first time period setting circuit varies an output pulse width using a predetermined pulse width as a unit width, and determines the applying period in response to a set pulse width, and said second time period setting circuit varies an output pulse width using the predetermined pulse width as a unit width, and determines the applying period in response to a set pulse width.

10. A vibration type driving device for applying a driving signal to an electro-mechanical energy conversion element to obtain a driving force, comprising:

a driving signal applying circuit for applying a driving signal having a first polarity to an electro-mechanical energy conversion element, and for applying a second driving signal having a second polarity opposite the first polarity to the electro-mechanical energy conversion element;

a first pulse signal forming circuit for forming pulse signals, said driving signal applying circuit applying a driving signal having the first polarity to the electro-mechanical energy conversion element in response to the pulse signals;

a first setting circuit for varying and setting a pulse width of a pulse signal formed by the first pulse signal forming circuit using a predetermined pulse width as a unit width;

a second pulse signal forming circuit for forming pulse signals, said driving signal applying circuit applying a driving signal having the second polarity to the electro-mechanical energy conversion element in response to the pulse signals; and a second setting circuit for varying and setting a pulse width of a pulse signal formed by the second pulse signal forming circuit using the predetermined pulse width as a unit width, said first and second pulse signal forming circuits forming respective pulse signals having a pulse width that varies with the predetermined pulse width as a unit width.

11. A vibration type driving device for applying a first frequency signal to a first electro-mechanical energy conversion element, and for applying a second frequency signal different in phase from the first frequency to a second electro-mechanical energy conversion element to obtain a driving force, comprising:

a first pulse signal forming circuit for forming pulse signals having a certain pulse signal width, and for controlling a frequency signal applying time applied to the first electro-mechanical energy conversion element on the basis of the pulse signal width;

a first setting circuit for varying and setting the pulse width of a pulse signal formed by the first pulse signal forming circuit using a predetermined pulse width as a unit width;

a second pulse signal forming circuit for forming pulse signals having a certain pulse signal width, and for controlling a frequency signal applying time applied to the second electro-mechanical energy conversion element on the basis of the pulse signal width; and a second setting circuit for varying and setting the pulse width of a pulse signal formed by the second pulse signal forming circuit using the predetermined pulse width as a unit width, said first and second pulse signal forming circuits forming respective pulse signals having a pulse width that varies with the predetermined pulse width as a unit width.

* * * * *

UNITED STATES PATENT AND TRADEMARK OFFICE
CERTIFICATE OF CORRECTION

PATENT NO. : 5,459,370
DATED : October 17, 1995
INVENTOR(S) : KENICHI KATAOKA

It is certified that error appears in the above-indentified patent and that said Letters Patent is hereby corrected as shown below:

At [57] Abstract

Line 1, "applies" should read --applying--.

Column 1

Line 27, "and" should be deleted.
Line 50, "aspects" should read --and aspects--.

Column 4

Line 9, "illustrated." should read --illustrated by example.--
Line 44, "pulses" should read --pulse--.

Signed and Sealed this

Fifth Day of March, 1996

Attest:

BRUCE LEHMAN

Attesting Officer    Commissioner of Patents and Trademarks